(12) United States Patent
Turpin et al.

(10) Patent No.: US 12,170,403 B2
(45) Date of Patent: Dec. 17, 2024

(54) ISOTROPIC 3D-PRINTED GRADIENT-INDEX RF LENS

(71) Applicant: All.Space Networks Limited, Reading (GB)

(72) Inventors: Jeremiah P. Turpin, Linthicum, MD (US); Zakaria Bouhanna, Swindon (GB); John Finney, London (GB); Ergin Dinc, Reading (GB)

(73) Assignee: All.Space Networks Limited, Reading (GB)

( * ) Notice: Subject to any disclaimer, the term of this patent is extended or adjusted under 35 U.S.C. 154(b) by 0 days.

(21) Appl. No.: 17/517,823

(22) Filed: Nov. 3, 2021

(65) Prior Publication Data

US 2022/0140493 A1  May 5, 2022

Related U.S. Application Data

(60) Provisional application No. 63/109,102, filed on Nov. 3, 2020.

(51) Int. Cl.
*H01Q 15/08* (2006.01)
*B29D 11/00* (2006.01)
(Continued)

(52) U.S. Cl.
CPC ....... *H01Q 15/08* (2013.01); *B29D 11/00355* (2013.01); *B33Y 80/00* (2014.12); *H01Q 15/02* (2013.01); *B33Y 10/00* (2014.12)

(58) Field of Classification Search
CPC ........ H01Q 15/08; H01Q 15/02; H01Q 15/10; B33Y 80/00; B33Y 10/00; B29D 11/00355

See application file for complete search history.

(56) References Cited

U.S. PATENT DOCUMENTS

| | | | | | |
|---|---|---|---|---|---|
| 6,081,239 | A | * | 6/2000 | Sabet | H01Q 19/062 |
| | | | | | 343/753 |
| 9,771,490 | B2 | * | 9/2017 | Weber | B33Y 70/10 |

(Continued)

FOREIGN PATENT DOCUMENTS

| | | | |
|---|---|---|---|
| CN | 107 611 619 B | | 7/2020 |
| JP | 2015505182 A | * | 2/2015 |
| WO | WO 2015/102938 A1 | | 7/2015 |

OTHER PUBLICATIONS

International Search Report and Written Opinion mailed Feb. 16, 2022 in connection with International Application No. PCT/GB2021/052846.

(Continued)

*Primary Examiner* — Dameon E Levi
*Assistant Examiner* — Anh N Ho
(74) *Attorney, Agent, or Firm* — Wolf, Greenfield & Sacks, P.C.

(57) ABSTRACT

Inhomogeneous dielectric lenses for electromagnetic waves can be produced by a process such as 3D printing to have controllable dielectric values. Dielectric values can be produced by a varying density of air voids within, for example, a dielectric matrix to obtain an effective overall density. Approaches in accordance with various embodiments can obtain uniform, isotropic dielectric properties without resonant behavior by the use of aperiodic distributions of non-uniformly-sized air voids. Target air fraction and distribution of air voids can be specified by a target dielectric constant through dielectric mixing rules, such as Maxwell-Garnet mixing rules, and a requirement for locally uniform distributions of air voids, while varying the density of the air voids across the overall structure to produce a desired gradient of dielectric properties.

23 Claims, 9 Drawing Sheets

(51) Int. Cl.
*B33Y 10/00* (2015.01)
*B33Y 80/00* (2015.01)
*H01Q 15/02* (2006.01)

(56) References Cited

U.S. PATENT DOCUMENTS

| | | | |
|---|---|---|---|
| 11,103,892 B1* | 8/2021 | Liao | C23C 16/56 |
| 11,340,386 B1* | 5/2022 | Ouderkirk | C23C 16/48 |
| 2017/0192595 A1* | 7/2017 | Choi | H10N 30/092 |
| 2017/0279201 A1* | 9/2017 | Gerding | H01Q 19/06 |
| 2018/0183152 A1 | 6/2018 | Turpin et al. | |
| 2020/0018874 A1* | 1/2020 | Chisum | H01Q 15/10 |
| 2020/0083612 A1* | 3/2020 | Diehl | H01Q 19/06 |
| 2020/0122387 A1 | 4/2020 | Polidore et al. | |
| 2021/0091478 A1* | 3/2021 | Sledkov | H01Q 19/062 |

OTHER PUBLICATIONS

[No Author Listed], Electronically steered antenna array for LEO. Swissto12 SA, https://swissto12.com/. Nov. 2, 2020, 2 pages, [last accessed Jan. 30, 2023].

Bor et al., Foam Based Luneburg Lens Antenna at 60GHz. Progress In Electromagnetics Research Letters. 2014;44:1-7, 7 pages.

Liang et al., A 3-D Luneburg Lens Antenna Fabricated by Polymer Jetting Rapid Prototyping. IEEE Transactions on Antennas and Propagation, Apr. 2014; 62(4):1799-807.

Liew et al., Photonic Band Gaps in Three-dimensional Network Structures with Short-range Order. Physical Review A 84. Aug. 2011. 6 pages.

Markel V. A., Introduction to the Maxwell Garnett approximation: tutorial. J. Opt. Soc. Ameri A. Jul. 2016;33(7):1244-56.

Zhang et al., 3D-Printed Planar Graded Index Lens. IET Microwaves, Antennas & Propagation. Oct. 2016. 10;10(13):1411-9, 20pgs.

* cited by examiner

ISOTROPIC 3D-PRINTED GRADIENT-INDEX RF LENS

CROSS-REFERENCE TO RELATED APPLICATIONS

This application claims priority to U.S. Provisional Application Ser. No. 63/109,102, filed Nov. 3, 2020, and entitled "Isotropic 3D-Printed Gradient-Index RF Lens," which is hereby incorporated herein in its entirety and for all purposes.

FIELD OF THE DISCLOSURE

Aspects of the present disclosure relate to three-dimensional (3D) printing, such as the 3D printing of a pseudo-random distribution of air voids within a dielectric matrix to form an inhomogeneous gradient-index (GRIN) lens with isotropic dielectric properties for shaping and directing radio frequency (RF) and microwave signals.

BACKGROUND

Additive manufacturing and 3D printing are rapidly improving in resolution, strength, and capability. New functional devices and structures are created and released often, with initial examples being ways to build conventional structures using the new methods, but later examples instead finding ways to build structures that could not have produced by any other method.

The materials that are used for additive manufacturing, and in particular Filament Deposition Modeling (FDM), continue to improve. FDM functions by depositing small amounts of a polymer or other material through a heated nozzle as a filament along a controlled path in three dimensions. Filament is a term used here to generally refer to the material being deposited, both in the supplied form as a spool of material with a defined diameter (such as 1.75 or 2.85 mm) as well as the post-deposited material.

Additive manufacturing and 3D printing (FDM & other implementations) are being used to create new forms of antennas and materials for microwave and electromagnetic devices. Examples of printed antennas include the printing of metallic structures such as waveguides via direct additive manufacturing of metals [R4], or via plating of polymer structures with metal coatings, resonators, enclosures, and antennas with complex geometries [R5].

Gradient-index (GRIN) lenses and other refractive devices rely on changes in the dielectric constant or refractive index throughout a region of space to steer and control the flow of electromagnetic waves (e.g., RF, microwaves). Examples include Luneburg lenses, Wood lenses, and substantially planar optimized lenses. US Patent Publ. No. 2018-0183152 also discloses a layered lens design.

GRIN lenses are typically fabricated through continuous diffusion processes with glass for visible and infrared (IR) optics, and through stepwise-discrete steps of individually homogeneous materials in the case of RF optics. The RF optics have been assembled from a series of materials that are individually shaped and fit together to form a single device with approximately-continuous dielectric profile. Luneburg lenses have been manufactured from hemispherically-machined pieces of foam with varying densities. Polymer materials can be injection molded or cast, and ceramics can be molded. Varying the dielectric and other material properties throughout the structure yields behavior consistent with the design.

The materials for producing a high-quality gradient-index lens possess certain qualities. These include low dielectric loss tangent (to minimize the energy converted to heat within the device), nondispersive, non-resonant material properties (to yield broad bandwidth), isotropic electromagnetic responses (to avoid polarization impacts to the incident signal), and must have sufficient mechanical & thermal strength to operate, and be able to be manufactured at a reasonable cost.

3D printing has been recognized as a key advantage for gradient-index lenses, because of the design and production flexibility that it provides. Examples have been published that demonstrate varying the material density (via changing one or more structural dimensions of a printed unit cell with respect to position) of the printed part in order to change the effective dielectric constant with respect to position, and so obtain the necessary dielectric constants. These examples however are built up in a convenient way for the 3D printer, but use patterns and periodic infill structures that result in significant anisotropy within the structure.

Artificial dielectrics use subwavelength structures to control the effective dielectric response of a medium. An artificial dielectric uses composite material techniques to mix multiple dielectrics or dielectric and conductors in order to get effective responses without resonances. The size and periodicity of the physical structures in both cases significantly impact the dielectric properties, with electrically larger (large physical size relative to a wavelength at the operational frequency) structures and periodicity yielding behavior that is less accurately represented as a homogeneous, isotropic dielectric.

The effective dielectric constant of air-dielectric mixtures are computed by ways of material mixing rules, of which the Maxwell-Garnet mixing equation is commonly used, representing the effective dielectric properties of a material composed of a solid matrix with inclusions of a second material. The shape, orientation, arrangement, and density of the inclusions all impact both the form of the equation as well as the resulting dielectric constant for a given mixture, as does the selection of the host matrix media and the inclusion media.

BRIEF SUMMARY OF THE DISCLOSURE

In at least some embodiments, homogeneous dielectric lenses for electromagnetic waves can be produced by 3D printing to have controllable dielectric values. These dielectric values can be produced by, in at least some embodiments, a varying density of spherical air voids within a dielectric matrix to obtain an effective overall density. Structure sizes on the order of a tenth of a wavelength at the operational frequency represents a typical size for a periodic structure of air voids, and simulates the response of crystalline materials to electromagnetic waves. However, amorphous (aperiodic) structures can yield significant benefits to desirable behavior. Approaches in accordance with various embodiments can obtain uniform, isotropic dielectric properties without resonant behavior by the use of aperiodic distributions of nonuniformly-sized air voids. Target air fraction and distribution of air voids can be specified in at least one embodiment by the target dielectric constant through the Maxwell-Garnet mixing rules (or other dielectric mixing rules) and a requirement for locally uniform distributions of air voids, while varying the density of the air voids across the overall structure to produce the desired gradient of dielectric properties.

This summary is not intended to identify all essential features of the claimed subject matter, nor is it intended for use in determining the scope of the claimed subject matter. It is to be understood that both the foregoing general description and the following detailed description are exemplary and are intended to provide an overview or framework to understand the nature and character of the disclosure.

BRIEF DESCRIPTION OF THE DRAWINGS

The accompanying drawings are incorporated in and constitute a part of this specification. It is to be understood that the drawings illustrate only some examples of the disclosure and other examples or combinations of various examples that are not specifically illustrated in the figures may still fall within the scope of this disclosure. Examples will now be described with additional detail through the use of the drawings, in which.

DETAILED DESCRIPTION OF THE DISCLOSURE

Figure 1A:
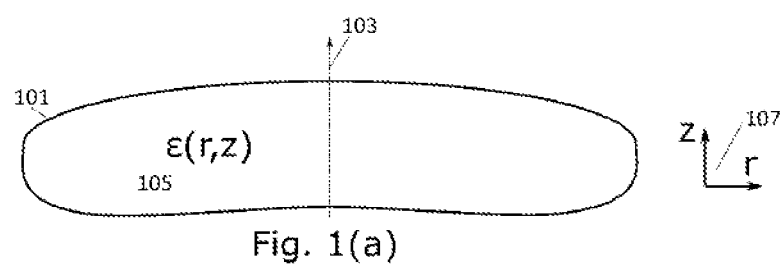
FIGS. 1(a) and 1(b) show a representative GRIN lens in both a continuous gradient as well as discretized construction.

In describing the illustrative, non-limiting embodiments illustrated in the drawings, specific terminology will be resorted to for the sake of clarity. However, the disclosure is not intended to be limited to the specific terms so selected, and it is to be understood that each specific term includes all technical equivalents that operate in similar manner to accomplish a similar purpose. Several embodiments are described for illustrative purposes, it being understood that the description and claims are not limited to the illustrated embodiments and other embodiments not specifically shown in the drawings may also be within the scope of this disclosure.

In at least one embodiment, an inhomogeneous material can be utilized to fabricate a radio frequency lens using additive manufacturing (also known as 3D printing or FDM (e.g., fused deposition modeling)). The inhomogeneous material can be fabricated using additive manufacturing as a solid matrix of printed filament material to have minimal amounts of air as gaps or spaces. This inhomogeneous material can be fabricated with a varying internal dielectric constant by utilizing a printed structure that incorporates controlled amounts of air as gaps or spaces into the solid matrix of the printed filament material. For example, in at least one embodiment the gaps or spaces are incorporated into the solid matrix by 3D printing material with the gaps or spaces (i.e., the gaps or spaces are unprinted regions).

The filament can include any supported material for FDM, but in one embodiment is a material with good RF performance. Raw polymers will typically have dielectric constants in the 2.5 to 3.5 range, but the polymer can be loaded with other materials to yield different properties, such as increased dielectric constant up to 10 or 15.

Air can be used as a mixing element with the polymer (rather than another polymer or some other material) in at least one embodiment due at least in part to its low dielectric constant (1). A range of possible dielectric constants that can be printed may be bounded by the source materials—the host or matrix material (FDM filament material) and the filler or inclusion (air). Decreasing the effective density by mixing air with the material can have a corresponding decrease in the dielectric constant, based on the mixing rules.

In at least one embodiment, a gradient index lens or other inhomogeneous refractive device (such as a prism) can be composed of a volume of a solid material with a specified distribution of dielectric or other material properties with respect to the location inside the lens. FIG. 1(a) shows a representative lens 101, which may have different shapes and external profiles, and represents the gradient as a dielectric constant function c 105 in the r and z axes 107. Although illustrated with an axis of symmetry 103, such that the lens is symmetric about the vertical axis to form a cylinder, lenses may be constructed with different or no symmetry. The dielectric gradient function 105 is selected by a one of a number of existing methods to obtain a desired electromagnetic behavior, such as (but not limited to) focusing, defocusing, beam shifting or bending, imaging, or beamforming. The resulting dielectric constant function 105 must then be fabricated.

Figure 1B:
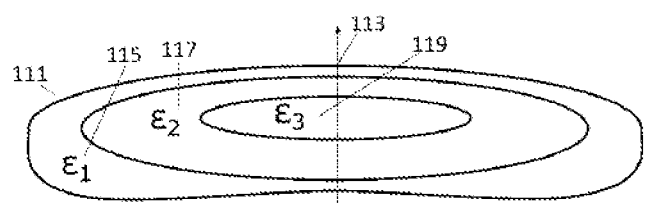

Since a continuously-graded dielectric constant as defined by 105 can be a challenge to produce, an alternate fabrication methodology can be used to discretize the resulting dielectric constant profile to a set of fixed values, and divide the lens 101 into discrete regions each with a fixed dielectric constant. This is illustrated in FIG. 1(b) by the discrete gradient-index lens 111, shown as symmetric about the axis of symmetry 113, and composed of three regions of individually homogeneous materials 115, 117, 119. It is clear that different numbers, shapes, and distributions of regions can be created when discretizing a lens. Typically, the number of discrete regions is selected based on a combination of fabrication constraints and performance—more, thinner layers achieves a better approximation to a continuous gradient.

The geometric and material tolerances for gradient index lenses and other inhomogeneous refractive devices (prisms, etc.) can be stringent, and may require accurate representation of the geometry with accurate dielectric constants are required. Printing each layer as a solid chunk of material of the specified dielectric constant is possible, but places strong constraints on the number of filaments and the specific values needed to produce a given lens. Instead, using the special characteristics of 3D printing to produce a mixture of a high-dielectric constant filament and a second material (either a second filament, or, more preferred and assumed, air) allows a single polymer filament to be used to produce a wide range of dielectric values, by varying the fraction of air included in the printed structure.

Optimal electrical behavior may occur when air is uniformly and periodically distributed throughout the structure in at least some embodiments. Nonuniform air distribution can lead to inhomogeneities within the fabricated device, and periodically-distributed air distributions (as in reference R2) can lead to resonances and other undesired behavior in the electromagnetic device. Spherical voids (or approximately spherical voids, at least) are preferable to produce an isotropic dielectric response. Isotropic dielectrics are those that have the same properties for waves propagating in any direction, while waves propagating in anisotropic dielectrics will behave differently depending on the direction of propagation. Isotropic dielectrics are preferred for most applications, and achieving an isotropic response is generally desirable. Non-spherical air voids must include a uniform distribution of orientations as well as a uniform distribution of voids themselves to produce an isotropic dielectric property, in addition to the homogeneous property already discussed. Therefore, distributions of spherical air voids are provided in one embodiment, though in other embodiments non-spherical air voids might be utilized, such as where some background anisotropy is required to be canceled out by the air voids.

Approaches in accordance with various embodiments can be directed toward a way in which air is included and distributed throughout a lens structure. Unit cubes of a 3D structure that achieves a target air density within a material matrix that are electrically large compared to a wavelength (on the order of 1 to 10 or more wavelengths at the design frequency) can be specified in such a way that a resulting air-polymer composite material has an isotropic effective material response that is homogeneous within the cube relative to the wavelength of interest. A cube can be considered to be homogeneous when subsets of its volume are evaluated to have the same effective density as the entire cube.

Figures 2A, 2B, 2C, 2D, 2E, 2F:
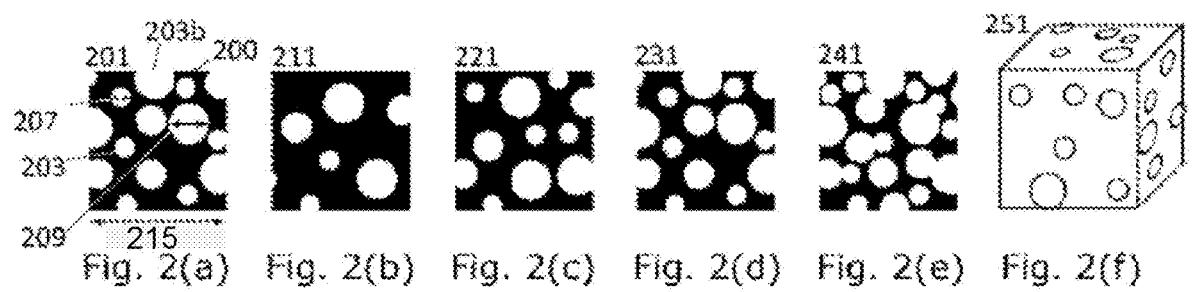
FIGS. 2(a)-2(f) show a set of representative air-dielectric composite unit cubes at varying fill densities.

Representative cubes are illustrated in FIG. 2(a)-(f), which illustrate a section of a lens 101, though the system and method can be utilized to print or manufacture any suitable product or component. The section of the lens 101 has material 200 with a plurality of air voids 203. The air voids are selected to be spheres with a range of diameters, and distributed such that the density is approximately uniform (when considering a length scale on the order of a wavelength). The air voids 203 can be completely within the cube region (FIG. 2(f)). Other voids 203b can intersect the surface of the cube region and manifest as a hole on the outside of the cube. Important factors to consider can include, as shown in FIG. 2(a) for the front surface of a representative air-dielectric cube 201: the edge length 215, the minimum air void diameter 207, and the maximum air void diameter 209. One goal can be to control a density of the region and therefore the overall printed structure as the ratio of solid and void volumes. Individual cubes can be analyzed and implemented separately to control the density within a finite region, simplifying the computational complexity compared to achieving a desired air density across a large structure by reducing the number of air voids to be processed at once. The cubes can be tiled together, so the edge length of the air cube determines the degree of periodicity. The edge length in at least one embodiment should be large to minimize periodic effects, but set small enough to make the computation of the air voids within a single cube feasible.

In at least one embodiment, a minimum edge length should be at least 4-10 times the maximum air void diameter. A minimum air void diameter 207 can be specified based, for example, on the resolution of the manufacturing approach that can be achieved, while the maximum air void diameter 209 is determined by the minimum frequency at which the cube is expected to meet a given dielectric value and uniformity. The maximum diameter 209 in this example should be on the order of a tenth of a wavelength in order to ensure a homogeneous electrical response, while an optimal minimum diameter 207 may be no greater than half of the maximum diameter 209, but at least twice the minimum printing resolution of the 3D printer as configured for the print. For example, with a 0.4 mm filament deposition nozzle on the 3D printer, the minimum void diameter 207 should be at least 0.8 mm. For an operational frequency of 10 GHz with a wavelength of approximately 3 cm, the maximum void diameter should be no more than 3 mm. A collection of different-sized air voids allows higher filling fractions of air to be achieved before intersections between aid voids are created, compared to a close-pack distribution of identical spheres, and also reduces the potential of any high-frequency resonances forming from a collection of identically-sized voids.

At lower frequencies, the minimum void diameter 207 can be increased to reduce the number of discrete voids that need to be created, since the volume of each void (and therefore the number of voids to meet a target air density within a fixed region) scales with the cube of the diameter. The maximum air void can continue to be set based on the operational wavelength as described previously.

As the design frequency increases, the maximum void diameter 209 can decrease in size, eventually reducing the range of allowable sphere sizes, since the minimum diameter is set by the resolution of the printing system and is not required to change with the frequency.

Multiple unit cubes 201 can form a template block or structure that can be repeated or replicated, then tiled together, cropped, and printed as a single structure to produce larger regions of a homogeneous dielectric. The individual cubes can be combined (e.g., merged or unioned) as a single 3D model that can be sent to an appropriate printer. Large edge widths 215 can be used to minimize the number of processing and merging steps to be performed to build up a given structure, but larger cubes may result in larger 3D models that are themselves more challenging to work with. Cubes with edge lengths 215 of 1 cm up to 10 cm can be used for the microwave frequency range of 1 GHz to 30-60 GHz, with sizes scaling with the wavelength outside of that range. Smaller cubes can be combined more times to produce a structure of a desired size, which can result in inhomogeneities at the intersections or boundaries between cubes.

Additional representative cubes are shown at lower 211 (FIG. 2(b)), 221 (FIG. 2(c)) and higher 231 (FIG. 2(d)), 241 (FIG. 2(e)) air inclusion densities. FIG. 2(f) shows a perspective view of a cube 251, illustrating that the air voids can be present across all of the faces and the interior of the structure.

Figure 3:
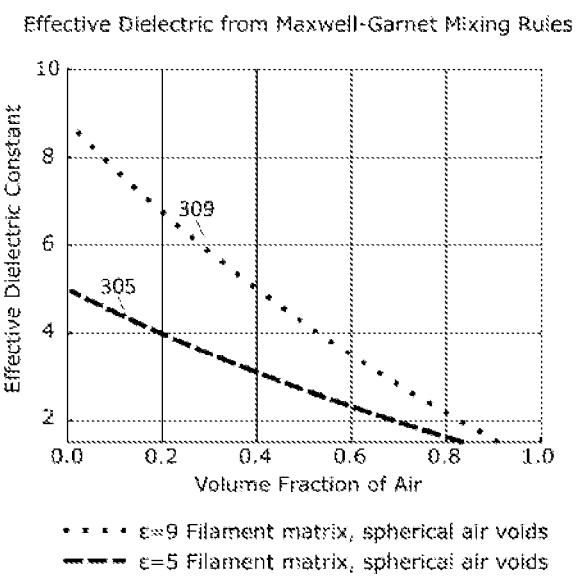
FIG. 3 shows a graph of the effective dielectric constant as obtained from the Maxwell-Garnet mixing rules of the composite unit cubes at different air fractions.

The graph 301 in FIG. 3 shows example effects of mixing a given fraction of air as spherical air voids into a solid material matrix composed of a polymer filament. The dielectric properties of the filament can determine the effect of different fractions of air. Representative curves plotted from the Maxwell-garnet equations for spherical inclusions for a filament dielectric of 9 (309) and a filament dielectric of 5 (305). Note that 3D printed structures are not able to achieve fully dense structures—even when printing at "100% infill", there are still small gaps between successive lines of filaments, which leads to a minimum achievable printed air inclusion ratio of approximately 5%.

For a given filament material, the air void-dielectric density may be determined solely by the volume ratio of air to material. It can be convenient to consider the air ratio, which is independent of the selected material, for design and analysis. The maximum air inclusion ratio may be determined by the structural properties of the printed medium. Perfect packing of uniformly-sized spheres can achieve air densities on the order of 70%, but some increase can be achieved with varying sphere sizes, as well as when allowing spheres to intersect to a greater or lesser extent. For example, larger sphere sizes having a maximum diameter can be combined with smaller sphere sizes that fit between the larger sphere sizes. However, once spheres are allowed to overlap, then structural considerations become dominant—too many intersections reduce the size of the solid regions and can make the structure brittle and unlikely to print successfully without a structural failure. Depending on the mechanical properties of the filament polymer, then maximum air filling fractions between 65-75% are expected. So fractions can be achieved from about 5-65% or even 5-75%, and optimally 0-70%.

In an example design process, once a continuous lens 101 has been discretized 111 and the dielectric constants selected for the multiple dielectric regions (e.g., 115, 117, 119), then the filament can be selected to achieve an appropriate dielectric constant within the 5-70% air ratio range of printable values. In at least some embodiments, the materials within a single device can fit within the 5-70% air fraction range of a single filament, but multi-material printers can be used to (for example) allow for low dielectric constants to be included in the same device as high dielectric constants. When mass of the printed device is a factor, then choosing higher dielectric constant filaments can result in overall lower densities for a given dielectric constant. For this reason, the mass of a printed structure can be reduced when using a higher dielectric constant filament, as long as the air ratio does not increase past the maximum printable value around 70%.

A single printable model (as may be represented as an .stl file or other suitable file format) can be constructed in stages, as illustrated in FIG. 4(a)-(j). Once appropriate air fractions are selected from the target dielectrics of each region 115, 117, 119 and the dielectric constant to air density in 301, unit cubes 211 (FIG. 4(a)), 231 (FIG. 4(d)), 241 (FIG. 4(g)) are constructed and tiled to create a larger block 411 (FIG. 4(b)), 431 (FIG. 4(e)), 441 (FIG. 4(h)), respectively, that is sufficiently large to cover the specified region. For example with respect to FIGS. 4(d), 4(e), this can be done by using the basic cube 231 and repeating that to form an array of the basic blocks 231 arranged in one or more rows and one or more columns (here, shown as 2×9) to form the larger block 431. The basic cube 231 is merged together where the blocks 231 join along an edge. The merging is performed by performing a union operation on their respective 3D model representations. The blocks 411, 431, 441 form a large region of homogeneous dielectric properties (as long as the air hole dimensions and distribution were selecting appropriately). The regions 115, 117, 119 are then filled by the contents of the blocks via a geometry intersection operation on the respective 3D model representation of the each region and block to create models of each region 413, 433, 443 that achieve the desired dielectric constant. The set of filled regions 413, 433, 443 are then merged together into a single structure 451, which by this method of construction has the target dielectric constant throughout the inhomogeneous lens.

Thus, a first region 413 can be formed from the first blocks 211 having a first dielectric constant; a second region 433 is formed from the second blocks 231 having a second dielectric constant; and a third region 443 is formed from the third blocks 241 having a third dielectric constant. The first, second and third regions 413, 433, 443 are merged or joined to form a single element or member 451. Here, the first region 413 is placed within the central opening of the second region 433, which in turn is placed inside the central opening of the third region 443. That can be done in one single simultaneous step or in two steps. However, the final printed product is a single integral member.

Figure 4A:
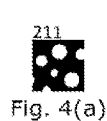
FIGS. 4(a)-4(j) show the representative discrete GRIN lens filled with the air-dielectric composite unit cubes.
Figure 4B:
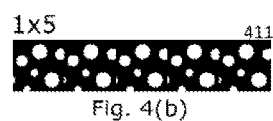
Figure 4C:
Figure 4D:
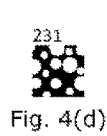
Figure 4E:
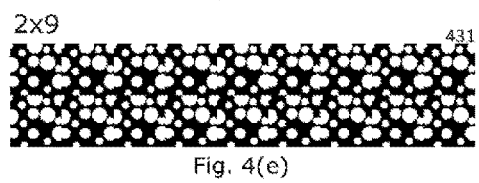
Figure 4F:
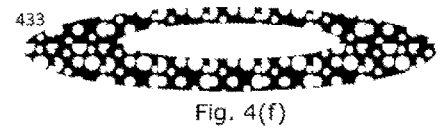
Figure 4G:
Figure 4H:
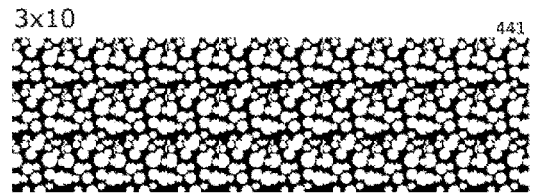
Figure 4I:
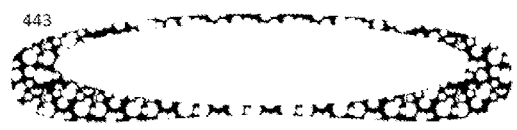
Figure 4J:
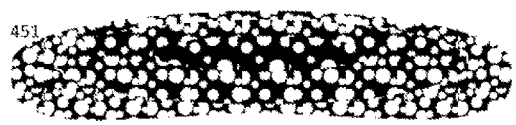

The purpose for building up the geometry of the air hole-dielectric lens 451 from smaller cubes of discrete material is to reduce the computational burden of filling a much larger region of space uniformly with air voids. The computational burden of uniformly filling a volume of space with air voids varies with approximately the square of the number of voids, which varies as the cube of the dimension of the structure. Processing the model in smaller chunks (such as the air-dielectric cubes 201) reduces the overall processing burden, but does result when performed in this way in discontinuities and hard interfaces between cubes and materials, which can change the effective homogeneity of the individual regions, as illustrated in FIG. 4(j).

Figure 5:
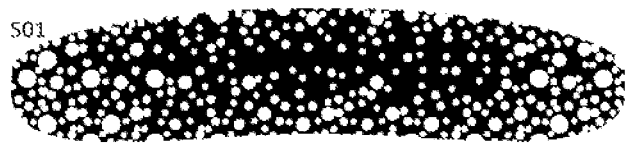
FIG. 5 shows the representative continuous GRIN lens filled with an air-dielectric matrix implementing the imposed gradient.

An alternate implementation is illustrated in FIG. 5, where the air voids are positioned directly within the lens at locations to produce average densities that align to the target dielectric constant. This allows for achieving target dielectric constants throughout the lens at resolutions corresponding to the dimensions of the air voids. The continuously-distributed air void lens 501 avoids the discontinuities at cube boundaries as were visible in the lens 451 constructed from individual cubes.

Figures 6A, 6B, 6C, 6D:
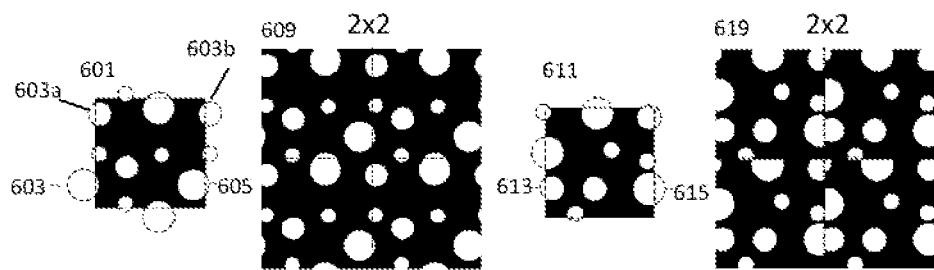
FIGS. 6(a)-6(d) show the impact of periodic placement of air voids on opposite faces of the unit cubes compared to aperiodic placement, and the impact on the resulting structure.

FIG. 6 illustrates another method of achieving higher computational efficiency while minimizing the discontinuities between the periodically-tiled cubes in accordance with at least one embodiment. Considering the cube 601 (FIG. 6(a)), the air voids that overlap with the surface of the cube (rather than those completely contained by the cube) are aligned such that opposite faces of the cube have identical air voids 603 and 605 arranged such that periodically tiling the cubes results in cleanly aligned air voids in larger blocks 609 (FIG. 6(b)). That is, for example, a first void 603a may be at a first side surface (the left in the embodiment of FIG. 6(a)), and a second void 603b may be at a second side surface (the right), where the first side surface is opposite the second side surface. Those voids 603a, 603b have a complementing shape and size. As shown by the dashed lines, the first void 603a can pattern a first void portion of a complete void having a desired shape (sphere) and size (diameter), and the second void 603b can pattern a second void portion of the same complete void, such that the first portion and second portion make up the entire complete void. Thus, when the cubes 601 are placed next to each other in the larger block 609, the first side surface mates with the second side surface with the first void portion forming a smooth and seamless merge with the second void portion. That is, the edges of the first void portion align with the edges of the second void portion, as illustrated by the dashed lines in FIG. 6(a) and by the appearance of complete voids in the larger block of FIG. 6(b).

This can have various benefits in a 3D printing process, since hard corners resulting from mismatched air voids 613, 615 at interfaces produced from cubes 611 (FIG. 6(c)) can be more challenging to print accurately, and can result in air density inhomogeneities at the interfaces between cubes as visible in the merged structure 619 (FIG. 6(d)). Reducing the mismatches at interfaces can make such a print job more efficient, and can reduce edge effects within the structure, among other such advantages.

Figure 7:
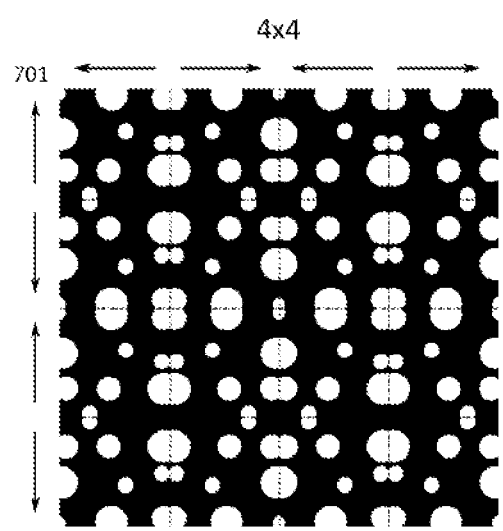
FIG. 7 shows a combined region composed of cubes with aperiodic air void placement, but mirroring the cubes across each axis across the structure to reduce the incidence of hard planar lines in the resulting printed device.

Accordingly, one option is to limit the voids on opposite surfaces to be aligned. Another option is to create a single region that is approximately or substantially homogeneous without adding a constraint that the air voids on opposite faces correspond. One of the factors that may be corrected by choosing cubes 601 with periodically-arranged air voids 603, 605 can be achieved with other cubes 611 by adjusting the orientation and arrangement of the cubes. FIG. 7 illustrates a larger volume 701 of air-dielectric cubes where each row and column is flipped relative to the axis to eliminate the discontinuities between the mismatched voids 613, 615 at the faces of the cubes. This still can leave regions of inhomogeneity at the interfaces, but this effect is minimal if the maximum air void size 209 is small with respect to the size of the unit cube 211.

Figures 8A, 8B, 8C:
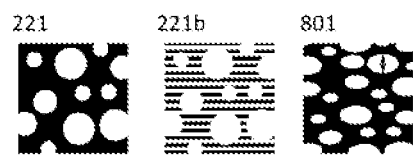
FIGS. 8(a)-8(c) show a modified air void pattern with ellipsoidal air voids, compressed in the direction of the layer deposition to compensate for the layer-induced anisotropy.

Depending on factors such as the print settings and frequency of operation relative to the layer height and feature size, the resulting solid material can demonstrate anisotropy in the material properties. FIG. 8(a) shows a representative spherical air void pattern 221, and the printed implementation 221b in FIG. 8(b), showing the construction of the structure as a series of planar, parallel, horizontal layers. Even with a uniformly distribution of air voids, with uniformly distributed sizes, the construction of the structure through the 2.5D, inherently multilayer process can result in a preferred direction in the resulting bulk material properties.

The mechanical anisotropy in the construction of the structure can result, when the layer thickness is not infinitesimal compared to the wavelength, in the effective dielectric properties also demonstrating anisotropic values. In this case, the effective dielectric constant when measured in the vertical direction would be different than the effective dielectric constant in the horizontal direction, as drawn in FIG. 8(b), making the printed structure a uniaxial material. To counteract the anisotropy in the dielectric properties, the spherical air voids in the design may be compressed into ellipsoids to make an anisotropy-corrected sample 801 in FIG. 8(c). The same principles apply to constructing lenses and other refractive structures from the anisotropy-corrected samples 801 with varying air density as have been derived in FIG. 4 and FIG. 5.

An appropriate degree of compression in the compressed sample 801 can be determined by measuring the anisotropy at the desired frequency by characterizing the dielectric constant of a sample along multiple axes. Any difference in the measured dielectric constants of the different axes indicates anisotropy. Modified samples with stretched or compressed samples along the axes with higher or lower dielectric constant, respectively can then be printed and measured to confirm the expected result, with the final selected scaling factor for the spheres to ellipsoids in the range 0.2 to 1.8 set to result in no measured anisotropy. Alternately, this same approach may be used to achieve a desired degree and direction of dielectric constant anisotropy, by stretching or compressing the air voids in different axes. In either case, the ellipsoidal air voids should be aligned in the direction to counteract existing anisotropy or to create desired anisotropy.

It should be understood that while lenses with cylindrical symmetry about the vertical z-axis are described and illustrated in this disclosure, that other refractive devices composed of a gradient or inhomogeneous distribution of bulk, isotropic dielectric media can be constructed using the disclosed processes. This may include, for example and without limitation, prisms, polarization conversion plates, radomes, and any other similar structures.

One of the benefits of 3D printing and additive manufacturing is the ability to create structures that could not have been produced effectively by other methods. In effect, the produced 3D printed lens is a 3D-printed sponge produced from a polymer material with varying hole sizes and densities specified throughout the structure. The air-mixture that achieves a target dielectric constant is less dense, in general, than the solid polymer material that achieves the same dielectric constant with a combination of a host polymer and high-dielectric filler, which makes this lens highly beneficial for producing larger structures where mass is critical. This lens is printed as a single component, and does not require post-assembly or machining, as would other process that require forming individual materials to a target form and then placing them together. Minimizing the number of assembly steps improves cost and reliability of a manufacturing process.

Figure 9:
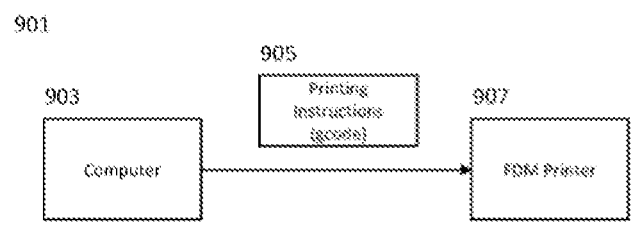
FIG. 9 shows an FDM printer connected to a computer.

As shown in FIG. 9, in one embodiment the system and method of the present invention 901 include operation by one or more processing devices 903, including a processing device in communication with the additive manufacturing device (i.e., 3D printer) 907. The processing device 903 provides printing instructions 905 to the additive manufacturing device 907. The processing device can be located remote from the additive manufacturing device and communicate by wire or wireless devices, or can be integral with the additive manufacturing device. The processing device can be any suitable device, such as a computer, server, mainframe, processor, microprocessor, controller, PC, tablet, smartphone, or the like. The processing devices can be used in combination with other suitable components, such as a display device (monitor, LED screen, digital screen, etc.), memory or storage device, input device (touchscreen, keyboard, pointing device such as a mouse), wireless module (for RF, Bluetooth, infrared, WiFi, etc.). The information may be stored on a computer medium such as a computer hard drive, on a CD ROM disk or on any other appropriate data storage device, which can be located at or in communication with the processing device. The entire process is conducted automatically by the processing device, and without any manual interaction. Accordingly, unless indicated otherwise the process can occur substantially in real-time without any delays or manual action.

It is noted that the drawings may illustrate, and the description and claims may use geometric or relational terms, such as sphere, circle, right, left, edge, corner, opposite, diameter, surface, cube, block, etc. These terms are not intended to limit the disclosure and, in general, are used for convenience to facilitate the description based on the examples shown in the figures. In addition, the geometric or relational terms may not be exact. For instance, walls may not be exactly perpendicular or parallel to one another because of, for example, roughness of surfaces, tolerances allowed in manufacturing, etc., but may still be considered to be perpendicular or parallel.

Numerous applications of the disclosure will readily occur to those skilled in the art. Therefore, it is not desired to limit the disclosure to the specific examples disclosed or the exact construction and operation shown and described.

Rather, all suitable modifications and equivalents may be resorted to, falling within the scope of the disclosure. For example, though the voids are formed as blocks or cubes (e.g., 201, 211, 231, 241, 251), other shapes can be utilized. And though the voids are shown to be circles or spheres, other shapes can be utilized such as ovals, pyramids, ellipses, prisms, prisms with round edges, and a union of any combinations of these or other such geometrical shapes.

What is claimed is:

1. A three-dimensional (3D)-printed radio-frequency refractive device, comprising:
    a material arranged in a multilayer structure having an inhomogeneous dielectric profile, a geometry of the multilayer structure having uniaxial properties; and
    air voids disposed within the multilayer structure of the material, wherein the air voids:
    i. are pseudo-randomly disposed within the material;
    ii. have diameters that are pseudo-randomly distributed within the material; and
    iii. provide an overall air fraction within the material, the overall air fraction configured to provide an effective dielectric constant in regions of the material; and
    wherein the air voids have a compressed shape configured to counteract the uniaxial properties of the geometry of the multilayer structure.

2. The three-dimensional (3D)-printed radio-frequency refractive device of claim 1, wherein effective material properties of the three-dimensional (3D)-printed radio-frequency refractive device include:
    (a) isotropic without preferred axes;
    (b) non-resonant; and
    (c) electrically large repeated tiles of the air voids.

3. The three-dimensional (3D)-printed radio-frequency refractive device of claim 1, wherein the material is printed from low-loss dielectric filaments as a single step without post-assembly.

4. The refractive device of claim 1, wherein the geometry of the multilayer structure having uniaxial properties comprises geometry of the multilayer structure having uniaxial dielectric properties.

5. A three-dimensional (3D)-printed radio-frequency refractive device, comprising:
    a set of regions of individually homogeneous dielectric, each region comprising a collection of air voids in a dielectric matrix,
    wherein the three-dimensional (3D)-printed radio-frequency refractive device has an inhomogeneous dielectric profile;
    wherein dimensions of the air voids are pseudo-randomly distributed within a range having a maximum value set by a minimum frequency of operation;
    wherein the air voids are pseudo-randomly distributed and not periodically tiled; and
    wherein the air voids are disposed within a multilayer structure of the three-dimensional (3D)-printed radio-frequency refractive device and have an elongated shape constructed to counteract anisotropy resultant from geometry of the multilayer structure.

6. The three-dimensional (3D)-printed radio-frequency refractive device of claim 4, having an inhomogeneous dielectric profile,
    wherein the dimensions of the air voids are pseudo-randomly distributed within a range with a minimum value set by a minimum printing resolution of a printer; and
    wherein an effective average air in regions of the set of regions of the three-dimensional (3D)-printed radio-frequency refractive device is configured to provide an effective dielectric constant to match the inhomogeneous dielectric profile.

7. The three-dimensional (3D)-printed radio-frequency refractive device of claim 5, where two filaments are used in a same print to extend a range of dielectric constant values achievable in a single print.

8. The three-dimensional (3D)-printed radio-frequency refractive device of claim 5, where a distribution of the air voids is unable to be produced by machining or non-additive manufacturing methods.

9. The three-dimensional (3D)-printed radio-frequency refractive device of claim 5, where the air voids have at least one shape comprising a ellipse, oval, pyramid, prism, prism with round edges, or a union thereof.

10. The three-dimensional (3D)-printed radio-frequency refractive device of claim 5, where the air voids are stretched or compressed from a sphere to be ellipsoidal and aligned with an axis to counteract the anisotropy of a layered printed structure.

11. A three-dimensional (3D)-printed radio-frequency refractive device, comprising:
    an inhomogeneous dielectric profile fabricated from a collection of nonuniformly-distributed air voids in a dielectric matrix,
    wherein the dimensions of the air voids are pseudo-randomly distributed within a range with a minimum value set by a minimum printing resolution of a printer;
    wherein an effective average air fraction of regions within the three-dimensional (3D)-printed radio-frequency refractive device is configured to provide an effective dielectric constant to match the inhomogeneous dielectric profile; and
    wherein the effective dielectric constant of the three-dimensional (3D)-printed radio-frequency refractive device has a continuous gradient rather than discrete layers; and
    wherein the air voids are disposed within a multilayer structure of the three-dimensional (3D)-printed radio-frequency refractive device and have an elongated shape constructed to counteract anisotropy resultant from geometry of the multilayer structure.

12. The three-dimensional (3D)-printed radio-frequency refractive device of claim 11, wherein one or more of the air voids are substantially ellipsoidal.

13. The three-dimensional (3D)-printed radio-frequency refractive device of claim 11, wherein the air voids are pseudo-randomly disposed.

14. The three-dimensional (3D)-printed radio-frequency refractive device of claim 11, wherein effective material properties of the three-dimensional (3D)-printed radio-frequency refractive device include one or more of:
    (a) isotropic without preferred axes;
    (b) non-resonant; or
    (c) electrically large repeated tiles of the air voids.

15. The three-dimensional (3D)-printed radio-frequency refractive device of claim 11, wherein the three-dimensional (3D)-printed radio-frequency refractive device is printed from one or more low-loss dielectric filaments.

16. The three-dimensional (3D)-printed radio-frequency refractive device of claim 11, wherein the air voids having the elongated shape are elongated along a direction aligned with layers of the multilayer structure of the three-dimensional (3D)-printed radio-frequency refractive device.

17. A refractive device, comprising:
a first material having a first section with a first set of air voids comprising a first fraction of air with respect to the first material, the first fraction of air providing a first dielectric constant, and
a second material having a second section with a second set of air voids comprising a second fraction of air with respect to the second material, the second fraction of air providing a second dielectric constant different than the first dielectric constant,
wherein air voids of at least one of the first set of air voids or the second set of air voids are disposed within a multilayer structure of the refractive device and have an elongated shape constructed to counteract anisotropy resultant from geometry of the multilayer structure.

18. The refractive device of claim 17, wherein the first material is a same material as the second material.

19. The refractive device of claim 17, wherein the first material is different than the second material.

20. The refractive device of claim 17, wherein at least one of the first set of air voids or the second set of air voids each have one or more dimensions.

21. The refractive device of claim 17, wherein at least one of the first set of air voids or the second set of air voids each have a same dimension.

22. The refractive device of claim 17, wherein at least one of the first set of air voids is pseudo-randomly arranged within the first material or the second set of air voids is pseudo-randomly arranged within the second material.

23. The refractive device of claim 17, wherein the air voids having the elongated shape are elongated along a direction aligned with layers of the multilayer structure of the refractive device.

* * * * *